March 22, 1966   E. A. WAHL   3,241,716
GRAVIMETRIC BELT FEEDER
Filed July 24, 1964   7 Sheets-Sheet 1
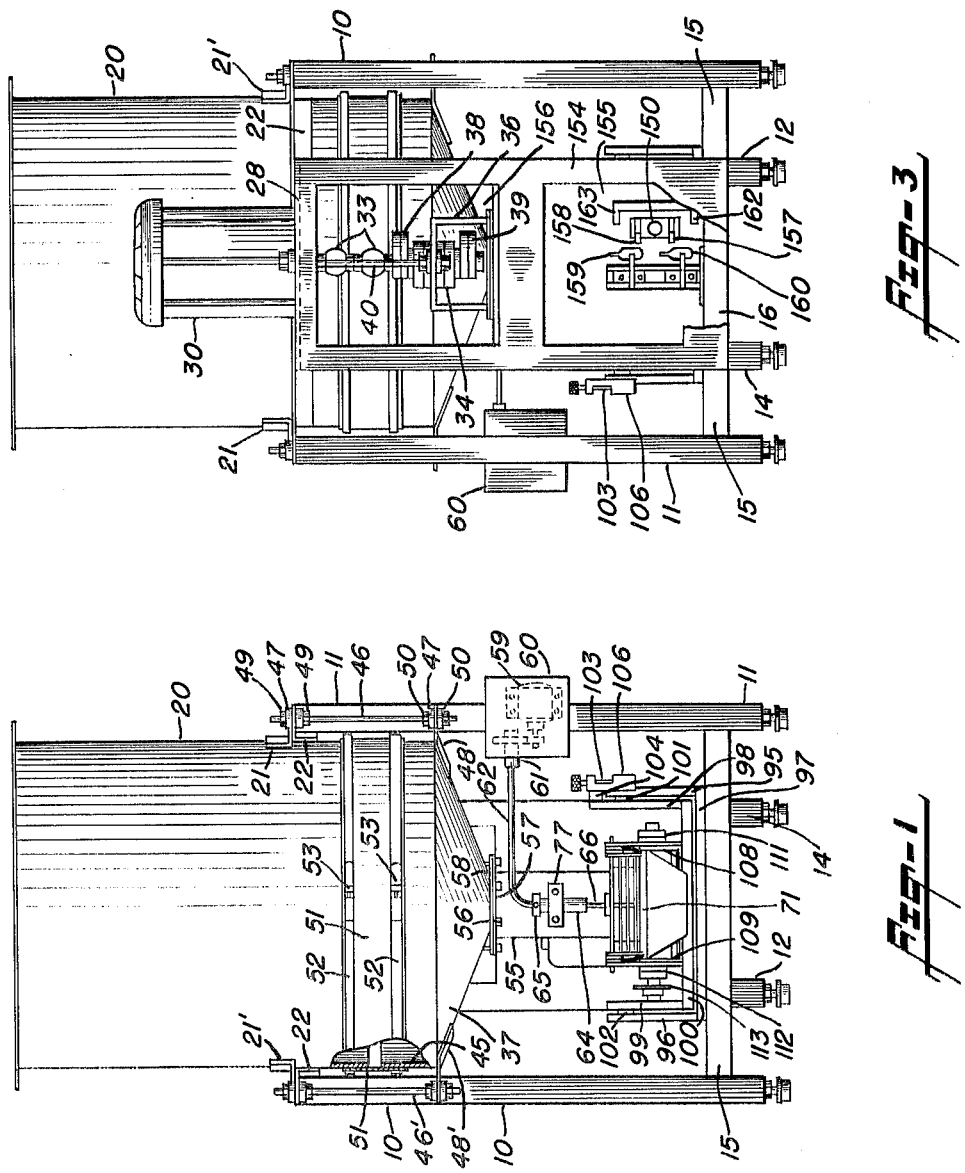
EUGENE A. WAHL
INVENTOR.
ATTORNEY March 22, 1966 E. A. WAHL 3,241,716
GRAVIMETRIC BELT FEEDER
Filed July 24, 1964 7 Sheets-Sheet 2
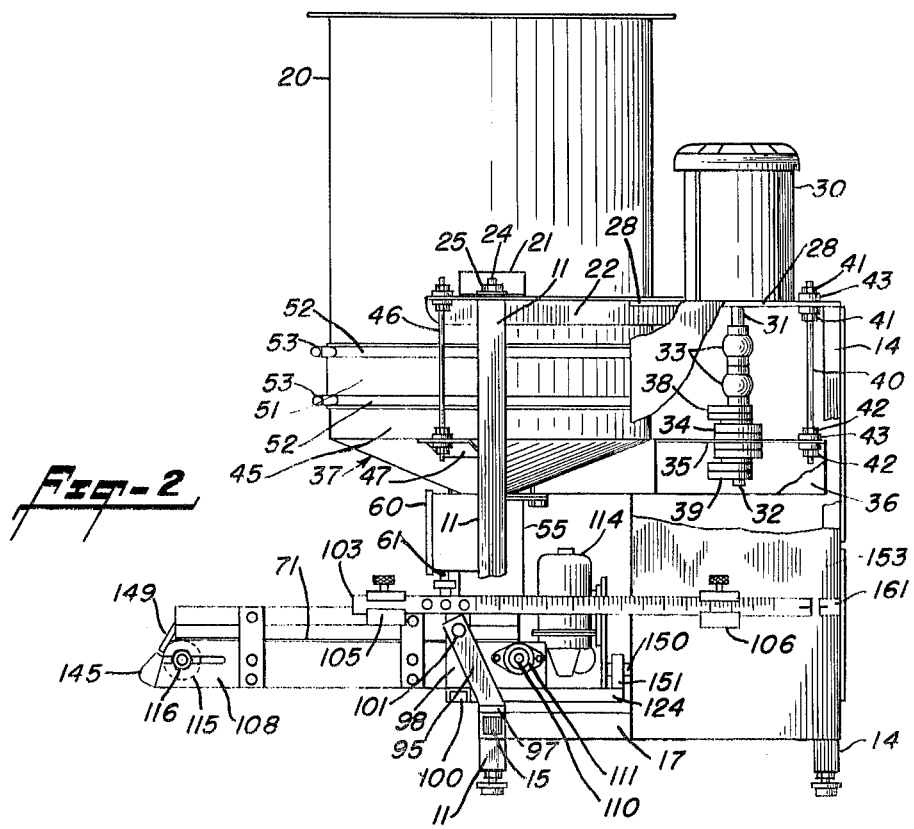
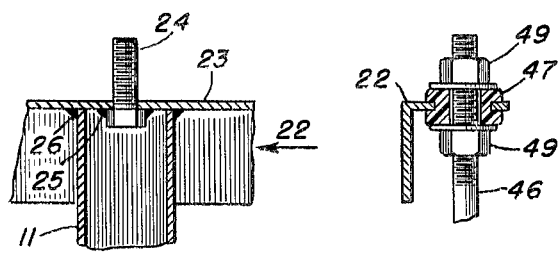
EUGENE A. WAHL
INVENTOR.
BY Rudolph J. Jurick
ATTORNEY

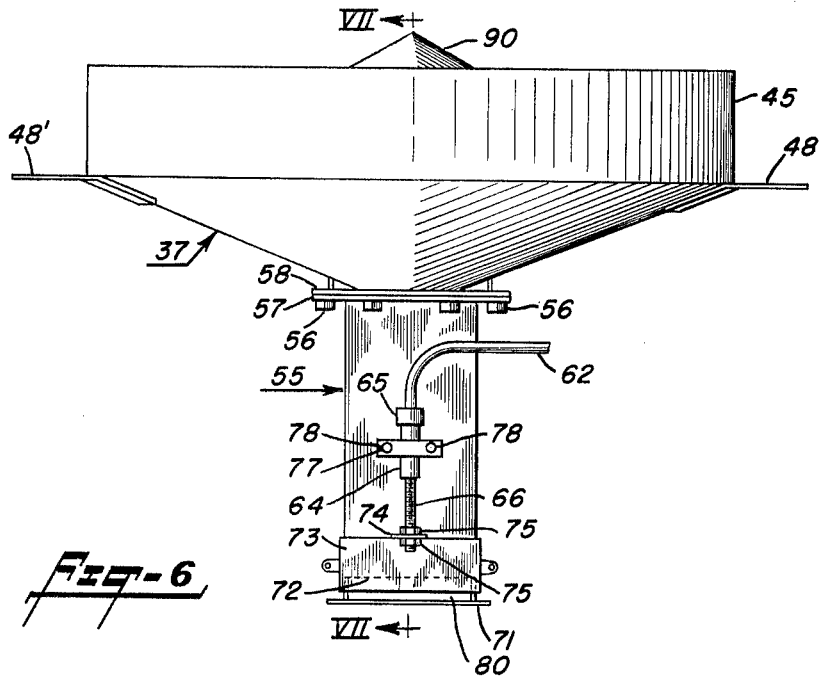
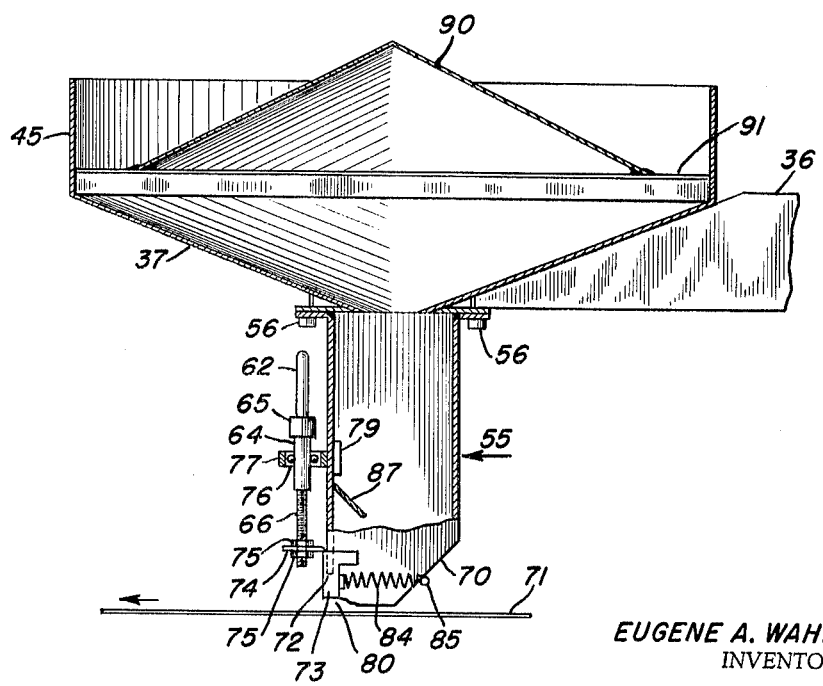

March 22, 1966  E. A. WAHL  3,241,716
GRAVIMETRIC BELT FEEDER
Filed July 24, 1964  7 Sheets-Sheet 4

EUGENE A. WAHL
INVENTOR.

BY Rudolph J. Lurich
ATTORNEY

March 22, 1966  E. A. WAHL  3,241,716
GRAVIMETRIC BELT FEEDER
Filed July 24, 1964  7 Sheets-Sheet 5

EUGENE A. WAHL
INVENTOR.

BY Rudolph J. Quick
ATTORNEY

EUGENE A. WAHL
INVENTOR.

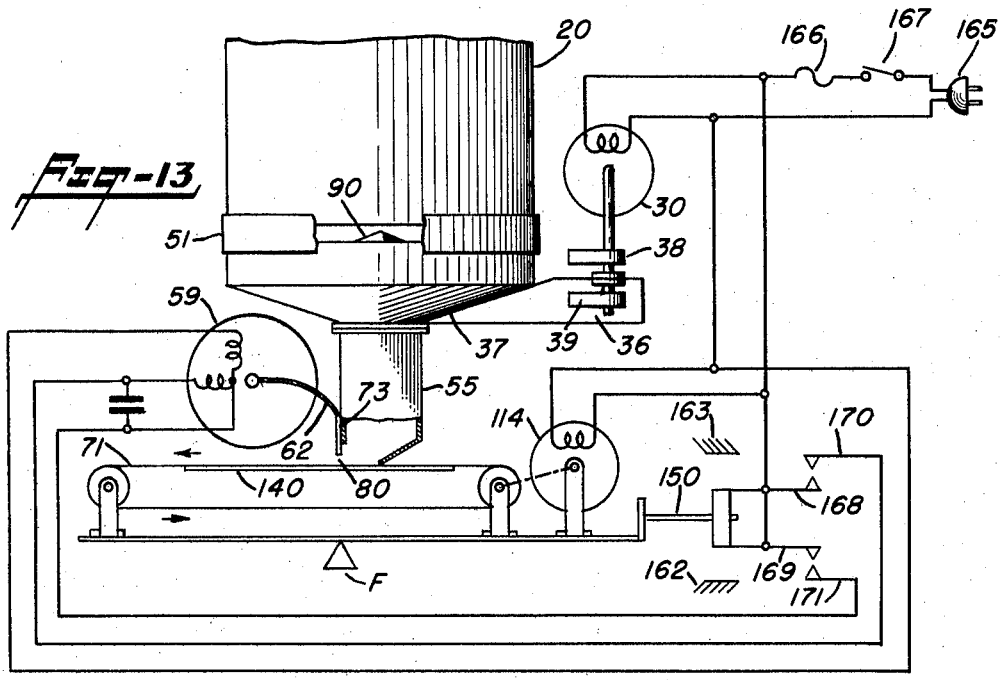
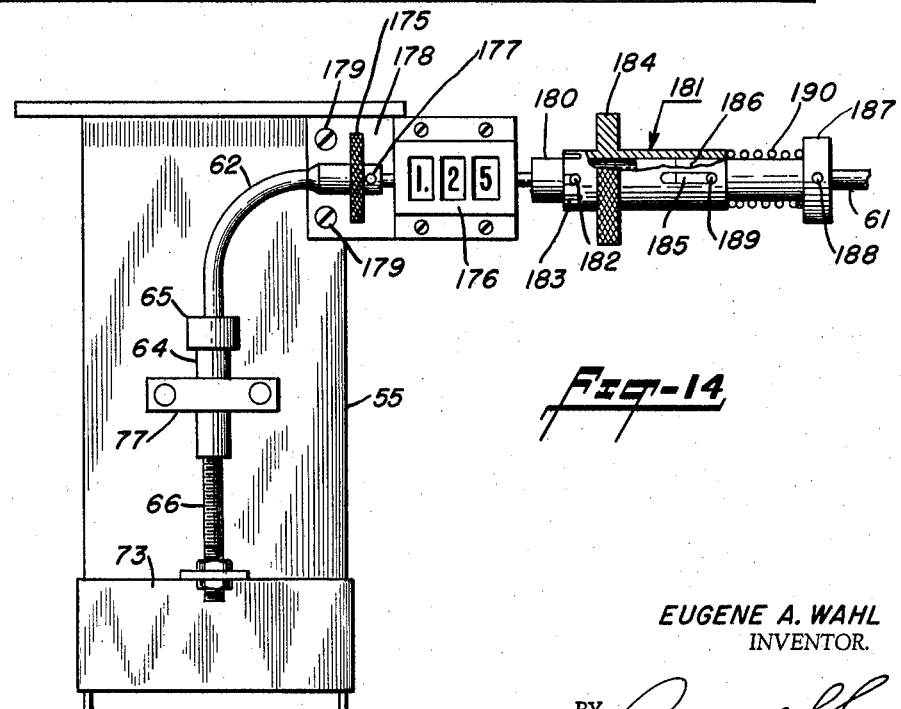

United States Patent Office 3,241,716
Patented Mar. 22, 1966

3,241,716
GRAVIMETRIC BELT FEEDER
Eugene A. Wahl, 294 Forest Ave., Glen Ridge, N.J.
Filed July 24, 1964, Ser. No. 387,817
20 Claims. (Cl. 222—45)

This invention relates to feeder apparatus for use with powdered, granular, or the like, material and more particularly to a combination gravimetric and belt feeder apparatus for dispensing a continuous stream of material at a predetermined precise rate.

Material feeders of the class to which this invention is directed generally are employed to provide a continuous flow of material into a medium as, for example, chemicals into a process stream.

Various gravimetric feeders have heretofore been proposed for dispensing powdered, granular, or the like, materials from a supply hopper at a constant rate. In general, existing gravimetric feeders are not capable of uniform, accurate operation with materials of widely different flow characteristics, such as free-flowing granular dry powders and sticky amorphous powders. The operating reliability of a feeder depends primarily upon the maintenance of material flow from the main supply hopper and along the various material-contacting surfaces to the discharge end of the apparatus. Sticky materials present serious problems since such materials adhere to the walls of the apparatus and bridge, particularly in regions where the material flow path is of reduced area. The resulting uneven flow of the material to the weighing mechanism of a conventional gravimetric feeder produces over and under oscillations of the mechanism about the desired, preset feed rate. This results in continuous system hunting, which limits the inherent accuracy of the feed rate.

Apparatus made in accordance with this invention overcomes the shortcomings of prior apparatus of this class. A horizontally-disposed belt is positioned to receive material from the supply hopper, said belt being moved at a constant speed and arranged to pivot about a fixed horizontal axis. Disposed between the hopper and the belt is an auxilliary device for directing the flow of material from the hopper onto the belt. This device is vibrationally isolated from the belt and is vibrated vigorously. Such vibration effectively fluidizes the contained material, thereby providing a positive continuous flow of the material out of the hopper and onto the belt. Means are provided for presetting the balance point of the belt as well as means for automatically adjusting the rate at which material is fed to the belt, thereby to maintain the belt in the balanced condition.

The movement of the belt at a constant speed, together with the constant, positive supply of material thereto at the preset rate, results in apparatus having a feed accuracy of better than 1%. Consequently, it is not necessary constantly to check-weigh, that is, to continuously sense the weight of the material carried by the belt. This eliminates the need for complex control arrangements, which otherwise would be essential to provide continuous adjustment of the rate at which material is supplied to the belt. A simple control system is provided for periodic adjustment of the feed rate, such as may be necessitated by gradual changes in the bulk density of the material.

An object of this invention is the provision of apparatus for feeding powdered, or granular material, at a predetermined feed rate, which apparatus is of a simple, rugged construction and having a high operating accuracy.

An object of this invention is the provision of combined gravimetric and belt feeder apparatus for providing a continuous discharge of material from a supply hopper at a predetermined, precise rate.

An object of this invention is the provision of a material feeder having a moving belt positioned below the discharge opening of a supply hopper, vibrating means providing a positive flow of material from the hopper and onto the belt, and automatic means for maintaining the quantity of material carried on the belt at a preset weight.

An object of this invention is the provision of a gravimetric belt feeder comprising a supply hopper having a discharge opening, a constant speed belt spaced from the hopper discharge opening, a material-receiving member communicating with the hopper discharge opening and having a material outlet opening presented to the belt, means for vigorously vibrating the material-receiving member, means balancing the belt about a fulcrum point lying in the plane containing said outlet opening, and means adjusting the effective size of said opening to maintain the belt load in a balanced condition.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a front, elevational view of apparatus made in accordance with this invention, with certain parts broken away and other parts shown in cross-section;

FIGURE 2 is a side elevational view of the apparatus also with certain parts broken away;

FIGURE 3 is a rear elevational view thereof;

FIGURE 4 is an enlarged fragmentary, cross-sectional view showing the arrangement for removably securing the supply hopper to the apparatus;

FIGURE 5 is an enlarged, fragmentary cross-sectional view showing the tie rod and grommet assembly for vibratorily supporting the auxiliary material-receiving member in operative position with respect to the supply hopper;

FIGURE 6 is an enlarged, front elevational view showing the assembly of the components forming a unitary structure subject to vibration by the gyrator;

FIGURE 7 is, essentially, a vertical, cross-sectional view taken along the line VII—VII of FIGURE 6;

FIGURE 13 is a schematic circuit diagram of the apratus, including a diagrammatic representation of pertinent mechanical components; and FIGURE 14 is a fragmentary, front elevational view of an arrangement for manually setting the adjustable gate to provide a predetermined material feed rate, with certain parts broken away and shown in cross section.

Figure 8:
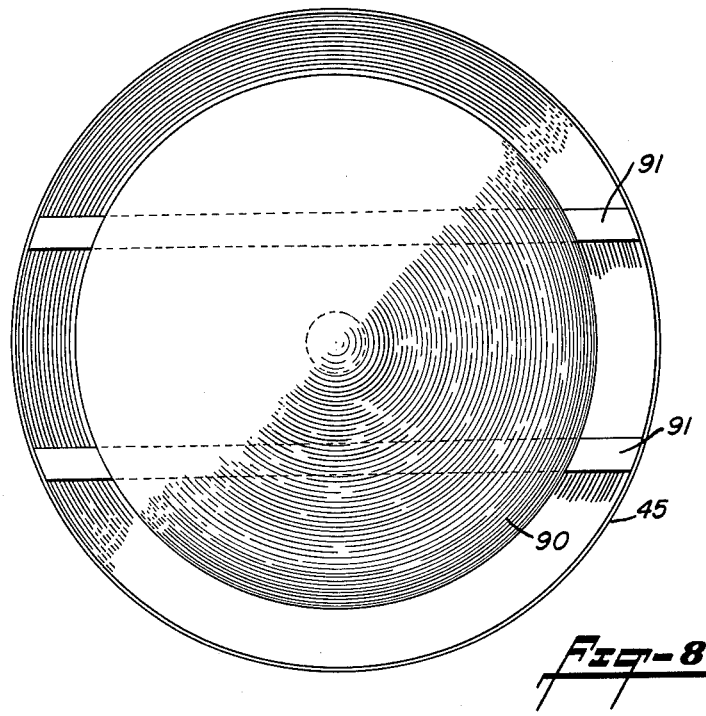
FIGURE 8 is a top plan view of the assembly shown in FIGURE 6.

Reference now is made to FIGURES 1–3. The apparatus is supported on four, tubular legs 10, 11, 12 and 14, desirably having a square cross-section, said legs being provided with adjustable feet for the purpose of leveling the apparatus. These legs are connected together, at their lower ends, by similar cross bars, the front cross bar 15, connecting the front legs 10 and 11, being visible in the particular view of FIGURE 1. The cross bar connecting the rear legs 12 and 14 is visible in the rear view of FIGURE 3 and is identified by the numeral 16. Also, one of the longitudinal cross bars 17, connected between the rear leg 14 and the front cross bar 15, is visible in the side view of FIGURE 2. A similar, longitudinal cross bar, not visible in the drawings, connects the rear leg 12 to the front cross bar 15.

A cylindrical hopper 20 has welded thereto a pair of angle brackets 21, 21' which rest upon the generally horizontal flange portion of an angle iron 22, which angle iron has been rolled into a circular configuration conforming to that of the hopper. The angle iron 22 is rigidly secured to each of the front legs 10, 11 of the apparatus, as shown in the fragmentary, cross-sectional view of FIGURE 4, to which reference now is made. The generally horizontal flange portion 23, of the angle iron 22, rests upon the end of the tubular leg 11 and is provided with a clearance hole for the bolt 24. The head of the bolt is first welded to the flange portion 23, as indicated by the numeral 25, after which the sides of the leg are welded to the flange portion, as indicated by the numeral 26.

Referring specifically to FIGURE 2, the bolt 24, carried by the leg 11, extends through a clearance hole formed in the angle bracket 21, whereby the hopper may be secured to the leg 11 by means of the nut 25. The other angle bracket 21' (see FIGURE 1) is similarly secured to the leg 10. Thus, the hopper is firmly, but removably secured to the forward legs 10 and 11, with the outer surface of the hopper wall in engagement with the angle iron 22.

Extending rearwardly of the hopper (see FIGURES 2 and 3) is a generally horizontal plate 28, the right end of which rests upon and is welded to the rear legs 12 and 14. The left end of this plate, as viewed in FIGURE 2, is cut out on a radius about the axis of the hopper 20 and abuts against the semicircular angle iron 22, said plate being welded to the generally horizontal flange portion of the angle iron. An electric motor 30 is secured to the horizontal plate 28 by suitable means, not shown, and has a drive shaft 31 extending through a clearance hole formed in the plate. This drive shaft is connected to an axially-spaced shaft 32 by means of flexible couplings 33, said shaft 32 passing through bearings 34 carried by the base portion 35 of a rigid strut 36 of generally inverted U-shape. The side legs of the strut extend along the surface of a conical member 37 and are welded thereto. Two sets of eccentrically-mounted weights 38 and 39 are secured to the shaft 32 on opposite sides of the bearing 34.

The strut 36 is suspended from the horizontal plate 28 by a tie rod 40 having threaded ends passing through rubber grommets 43, carried by the plate 28 and the strut 36. Such tie rod is adjustably secured in place by the cooperating sets of nuts 41 and 42. The center of mass of the weights 38 and 39 is displaced from the axis of the shaft 32, thereby forming a gyrator. Upon energization of the motor, the rotating weights impart vigorous, transverse vibrations to the strut 36 and the conical member 37 secured thereto, said conical member being vibrationally suspended from the semi-circular angle iron 22, as will now be described.

As shown in FIGURES 1 and 2, the conical member 37 includes an integral, cylindrical portion 45, which portion is in axial alignment with the supply hopper but spaced therefrom. The conical member 37 is suspended from the semi-circular angle iron 22 by the two tie rods 46, 46'. Referring, specifically, to the tie rod 46, the upper, threaded end passes through a rubber grommet 47, carried by the angle iron, and is secured in place by the cooperating nuts 49. The lower, threaded end of the tie rod passes through a similar grommet 47, carried by the angle bracket 48 which is welded to the conical member, and is secured in place by the cooperating nuts 50. The described tie rod assembly is best shown in FIGURE 5, which is an enlarged cross-sectional view taken through the upper portion of the tie rod 46.

With continued reference to FIGURE 1, the tie rod 46' is similarly secured in place by cooperating sets of nuts disposed on opposite sides of a grommet carried on the other end of the angle iron 22 and the bracket 48', which bracket also is welded to the conical member 37. The annular gap between the bottom end of the hopper and the cylindrical portion 45, of the conical member 37, is closed by a flexible band 51 made of suitable material, such as rubber, and secured in place by a pair of clamping rings 52. The ends of the clamping rings are drawn together by a suitable fastening arrangement generally identified by the numerals 53, thereby clamping the band in position.

From the description given to this point, it will be apparent that the conical member 37 is rigidly secured to the strut 36 (see FIGURE 2) and that this assembly is vibrationally suspended relative to the hopper by the forward tie rods 46, 46' (see FIGURE 1) and the rear tie rod 40 (see FIGURE 2). This assembly vibrates predominantly in a horizontal direction upon energization of the motor 30, it being apparent that the eccentric weights 38 and 39 rotate in a horizontal plane.

The conical member 37 receives material from the hopper and is provided with a truncated apex for delivery of the material to a vertically-disposed member, or downspout 55. This spout is a hollow member, of substantially square cross-section and is rigidly secured to the conical member 37 by means of the bolts 56 and the cooperating plates 57 and 58 secured respectively to the spout and conical member, as will be described in detail hereinbelow. The open bottom of the downspout 55 effectively is closed by a moving belt and the front wall of the spout (as viewed in FIGURE 1) is spaced from the belt to form an outlet opening through which material is transferred from the spout and onto the belt. This arrangement will also be described in detail hereinbelow. Suffice to say, for the present, that an adjustable gate is carried by the front wall of the spout, which gate is movable up or down, relative to the belt, thereby to control the depth of the powdered or granular material transferred onto the belt. Such vertical movement of the gate is effected by an electric motor 59 (contained within the housing 60 secured to the front leg 11), said motor having a drive shaft 61, extending through a clearance hole formed in the housing 60 and secured to a flexible shaft 62. The other end of the flexible shaft is welded to a collar 65, which collar is, in turn, removably secured to an internally-threaded rod 64 by a set screw. A gate adjusting screw 66 has one end threaded into the rod 64 and the other end secured to a gate, not visible in FIGURE 1.

The construction and assembly of the vibratory structure of the apparatus is best shown in FIGURES 6 and 7, to which reference now is made, FIGURE 6 being a front, elevational view (corresponding to FIGURE 1) and FIGURE 7 being a cross-sectional view taken along the line VII—VII of FIGURE 6, except for the lower portion of the spout and gate, the latter being shown in elevation. The lower portion of the rear wall forming the spout 55 is inclined toward the spout axis, as indicated by the numeral 70 in FIGURE 7, and the end thereof is spaced slightly from the upper surface of the endless belt 71. Such belt moves from right to left (as viewed in FIGURE 7) when the apparatus is in operation. The front wall of the downspout 55 terminates in a horizontal plane spaced a predetermined distance from the belt surface (as indicated by the numeral 72) thereby forming an outlet 80 for the flow of material out of the downspout and onto the belt during the time the belt is moving. The rate of flow of the material onto the belt is controlled by a vertically-disposed gate 73 spanning the front wall of the spout. This gate is provided with a forwardly-extending, integral tab 74 provided with a clearance hole for the adjusting screw 66, said screw being secured to the tab 74 by a pair of nuts 75.

The upper end of the adjusting screw 66 is threaded into the rod 64 (see also FIGURE 6), which rod is force-fitted through a bearing 76 rotatably carried by the bearing block 77. This block is secured to the front wall of the spout 55 by the two screws 78 which are threaded into a boss 79 welded to the inner wall of the spout. Thus, rotation of the flexible shaft 62 results in a corresponding rotation of the rod 64. Since this rod is force-fitted in the bearing 76 and since the screw 66 is anchored to the gate tab 74, the upper end of the screw is threaded into the rod 64 to a greater or lesser extent, upon rotation of the rod 64, thereby resulting in a corresponding vertical displacement of the gate 73. The spacing between the gate and the belt defines the vertical height of the outlet 80 through which material passes from the spout onto the belt.

Figure 9:
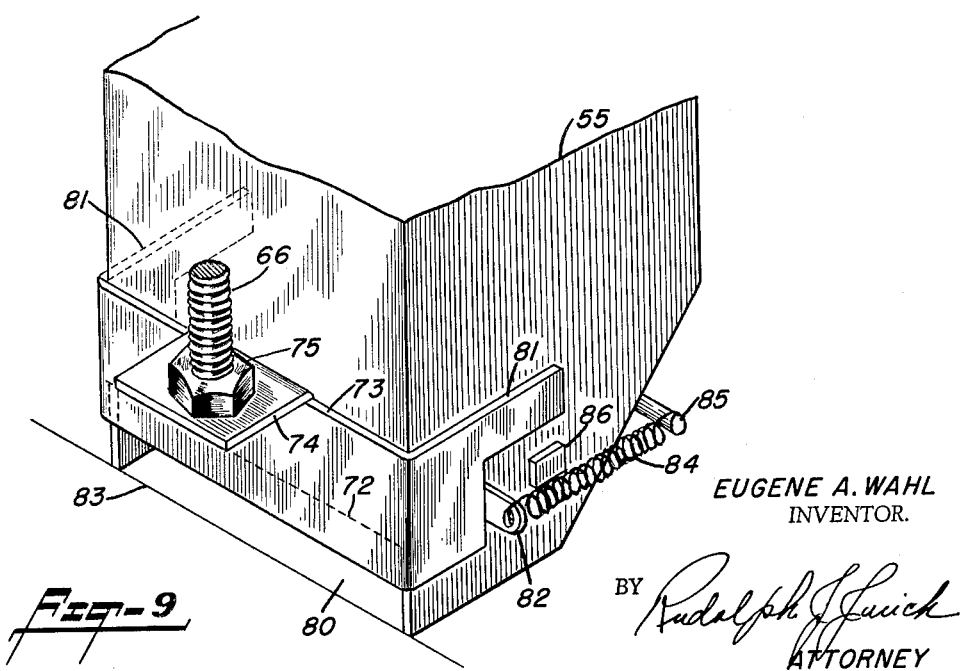
FIGURE 9 is an enlarged, fragmentary, isometric view showing the construction and arrangement of the adjustable gate and its assembly in operative position on the downspout.

The construction of the gate, and its assembly on the downspout, is shown in FIGURE 9. The gate 73 is a unitary member, made of sheet metal, folded to provide the forwardly-extending tab 74 (to which the adjusting screw 66 is secured), the sides 81 (which slide along the side walls of the spout 55) and the outwardly-directed ears 82, only one of such ears being visible in this view. It will be noted that the gate spans the front wall of the spout and that the vertical position of the gate defines the height of the outlet 80 relative to the surface of the belt, such belt surface being indicated by the numeral 83. A pair of coiled springs 84 have ends secured between a bar 85 and the associated gate ears 82, said bar being welded to the sloping rear wall 70 of the spout. These springs serve to maintain the gate firmly in engagement with the front wall of the spout. It will be apparent that the maximum height of the outlet 80 is determined by the lower end 72 of the spout front wall, while the minimum height may be zero when the gate is lowered into contact with the underlying belt. Welded to the opposed side walls of the downspout are a pair of buttons (only the forward such button 86 being visible in this particular view), which buttons form stops to limit the downward movement of the gate. It is again pointed out that the bottom of the downspout is spaced slightly from the upper surface of the belt, such spacing being of the order of 1/16 inch. Consequently, vibrations of the downspout are not directly transmitted to the belt.

Referring back to FIGURE 7, a deflector plate 87 extends along the entire front wall of the downspout and is welded thereto. This plate, together with the sloping rear wall 70 of the spout, reduces the head load of the material on the belt, thereby promoting a more uniform flow of the material through the outlet 80. Attention also is directed to the baffle 90, which is an inverted conical member having a peripheral surface spaced from the cylindrical portion 45 (of the conical member 37) and welded to a pair of spaced, angle iron cross bars 91. The two cross bars 91, which have ends welded to the cylindrical portion 45, are visible in the top plan view of FIGURE 8. The radial spacing between the baffle 90 and the cylindrical portion 45 constitutes an annular opening for the flow of the material from the hopper into the conical member. The material then flows out of the conical member into the downspout.

With particular reference to FIGURE 7, it is apparent that the baffle 90, conical member 37, strut 36 and spout 55 are rigidly secured together to form a unitary structure, which structure is vibrated in a predominantly transverse direction upon operation of the gyrator. In practice, the frequency and amplitude of the vibrations are such as to effectively fluidize the particular material contained within the conical member and the downspout. Most powdered and granular materials resist flow due to inter particle adhesion. Even in the case of many dry granular materials, the particles adhere to each other by reason of their irregular surface configurations. In any case, the coefficient of static friction between the particles is sufficient to resist separation of the particles to an extent necessary to impart a good flow characteristic to the particular material. This factor is further aggravated by the head load of the material, that is, the bulk weight of the particles overlying those at the bottom of a container. The vibrations imparted to the material particles by the vibrated structure of the apparatus are of a character sufficient to overcome the inter particle adhesion of the particular material. By maintaining the particles in a state of vibration or agitation, the material exhibits a pseudo-fluid characteristic and flows freely from the supply hopper, through the conical member and the downspout, and onto the moving belt.

The baffle 90 serves several functions. It imparts vibrations to the material at the lower portion of the hopper, thereby preventing a bridging of the material at this point. Also, the baffle eliminates the adverse effect of the head load of the bulk material upon the material contained within the conical member, thereby eliminating compacting of the material therein. Still further, the baffle prevents what generally is referred to as rat holing, that is, a predominant downward flow of the material along the hopper axis. Hence, the apparatus provides for a discharge of the material from the hopper substantially on a first-in, first-out basis. The adverse, variable effect of the material head load upon the belt is further eliminated by the deflector plate 87 (see FIGURE 7) and the sloping rear wall 70 of the downspout.

The described construction, together with the fluidizing of the material by vibration, results in a uniform density of the material overlying the belt and a positive, uniform flow of the material through the outlet 80 onto the belt.

The quantity of material carried by the belt is weighed continuously to provide a predetermined material feed rate, as will now be described.

Referring specifically to FIGURES 1 and 2, the conveyor assembly is cradled between a pair of sturdy arms 95, 96 welded to a base 97, which base is rigidly secured to the cross arm 15 (spanning the front legs 10 and 11) by suitable means, not shown. Spaced inwardly from the arms 95 and 96 are a second pair of arms 98 and 99 which have lower ends welded to an inverted, U-shaped cross bar 100. The adjacently-disposed arms 95 and 98 are pivotally coupled together by a conventional flexural pivot 101 and the similarly disposed arms 96 and 99 are pivotally coupled together by a flexural pivot 102. These flexural pivots are well known devices for supporting a mechanism which is to be limitedly rotated about an axis. They comprise flexing, crossed, flat springs connecting together the adjacently-disposed arms and may be considered equivalent to knife edge supports in that they offer substantially no friction to limited, relative rotation of the arms 98 and 99 relative to the respective fixed arms 95 and 96. The cross bar 100 carries the conveyor assembly, to be described below, which assembly is freely pivotable about the aligned axes of the flexural pivots. Secured to the upper portion of the movable arm 98 is a poise arm 103, said poise arm being spaced from the arm 98 by a spacer block 104 and being provided with a graduated scale calibrated in factors of weight. Conventional poises 105 and 106 are slidably carried by the poise arm, the poise arm 105 being used for the initial balancing of the conveyor assembly and the poise 106 being settable along the scale to unbalance the weighing mechanism a predetermined amount in a clockwise direction, as viewed in FIGURE 2. It will be apparent that the described arrangement constitutes a beam scale which will be in a balanced condition when the weight of the powder carried by the belt 71 is precisely equal to the counteracting weight of poise 106.

The endless belt 71 passes over a pair of rollers disposed between and at opposite ends of the two vertically-spaced plates 108 and 109. The rear roller, not visible in FIGURES 1 and 2, is secured to a shaft 110 which is rotatable in the aligned bearings 111 and 112 carried by the two vertical plates. This shaft carries a sprocket 113 (see FIGURE 1) which is coupled to a synchronous, electric motor 114 by a suitable chain. The forward belt roller 115 (see FIGURE 2) is an idler roller rotatable about a shaft 116 passing through aligned slots formed in the forward end of the vertical plates 108 and 109. This shaft has threaded ends whereby the roller 115 may be secured in place to maintain the belt in taut condition.

Figure 10:
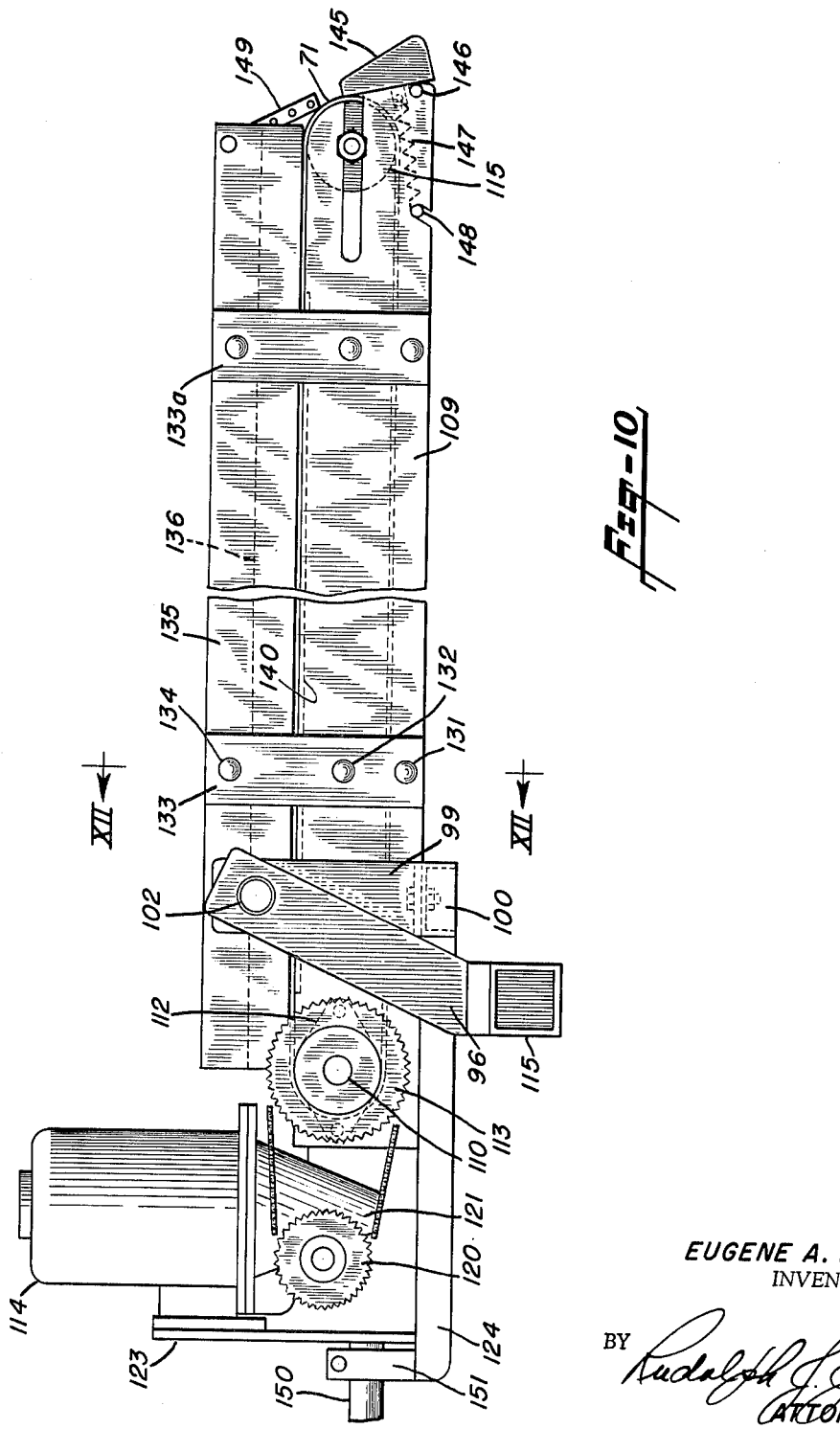
FIGURE 10 is a side elevational view of the conveyor assembly drawn to an enlarged scale and showing the side opposite to that shown in FIGURE 2.
Figure 11:
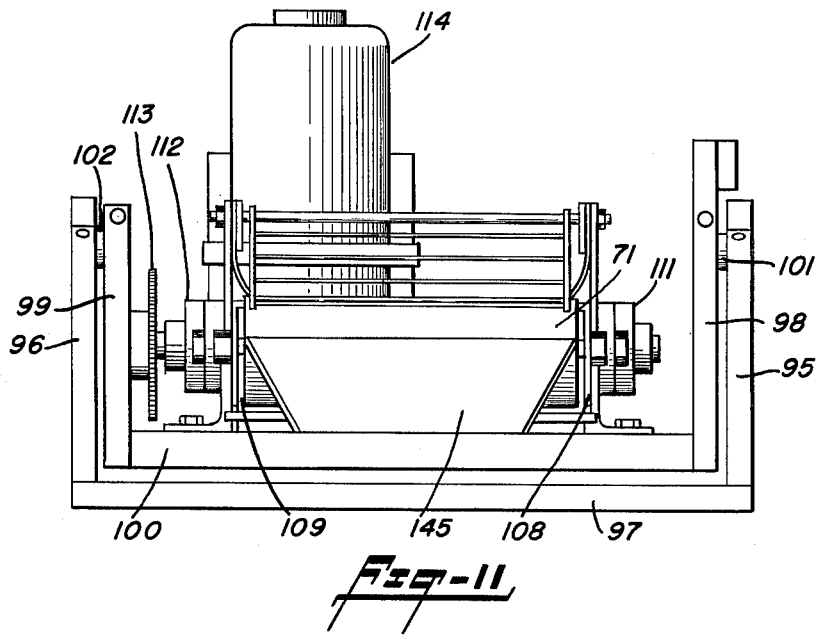
FIGURE 11 is a corresponding, front elevational view thereof.

A better understanding of the conveyor assembly will be had by reference to the enlarged views of FIGURES 10 and 11, which are side and front elevational views, respectively. The view of FIGURE 10 is reverse to that of FIGURE 2 in order to show the drive sprocket 120 secured to the output shaft of the gear reduction unit 121 of the synchronous motor 114. A chain couples the drive sprocket 120 to the sprocket 113 which is secured to the extension of the shaft 110 rotatably carried by the bearings 111 and 112 (see FIGURE 11). The motor 114 is secured to a vertical bracket 123 carried by a horizontal platform 124 which is secured to the cross bar 100, said cross bar having secured thereto the movable arms 98 and 99 pivotally coupled to the respective supporting arms 95 and 96.

The endless belt 71 preferably is a rubber timing belt having a smooth outer surface and a splined inner surface. The supporting rollers have similarly splined surfaces. This arrangement eliminates belt slippage which, together with the synchronous drive motor, results in a constant belt speed.

Figure 12:
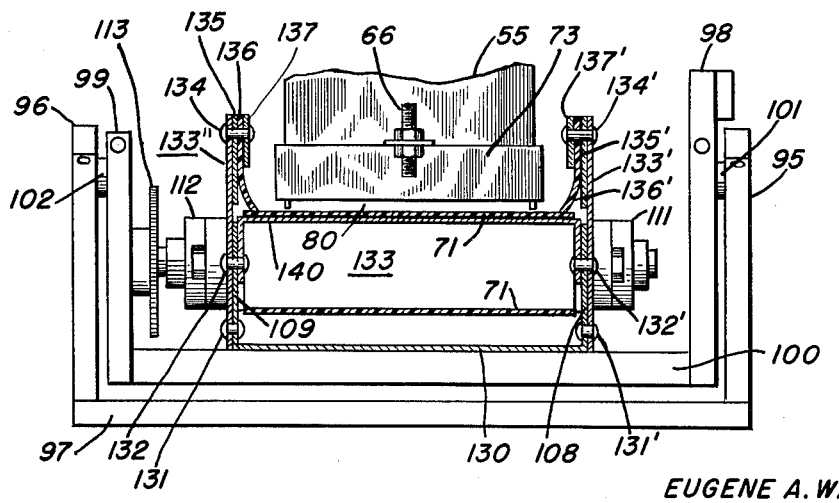
FIGURE 12 is a cross-sectional view taken along the line XII—XII of FIGURE 10, drawn to an enlarged scale and including a portion of the downspout.

Reference now is made to FIGURE 12, which is a cross-sectional view taken along the line XII—XII of FIGURE 10, and including the lower end of the downspout 55 carrying the adjustable gate 73. The spaced, vertical plates 108 and 109, carrying the bearings 111 and 112, are integral with a base portion 130, which base portion is welded to the cross bar 100 carrying the arms 98 and 99 that are rotatable about the axis of the flexural pivots 101 and 102. Secured to the vertical plate 109, as by rivets 131, 132, is a vertical bracket 133 which extends above the upper surface of the belt 71 passing over the rear, drive roller 133″. Secured to the upper portion of the bracket 133, as by the rivet 134, is a guide rail assembly comprising an outer, longitudinally-extending plate 135, a neoprene strip 136 and an inner plate 137. As shown in FIGURE 10, the guide rail assembly has a longitudinal length substantially equal to that of the supporting vertical plate 109 and extends beyond the flexural pivots. The forward end of the guide rail assembly is supported from the vertical plate 109 by a second vertical bracket 133a. Reverting back to FIGURE 12, the other guide rail assembly is of similar construction and similarly supported from the vertical plate 108, corresponding parts being identified by similar primed numerals.

Underlying the upper part of the belt 71 is a flat plate 140 having downturned sides which are secured to the vertical plates 108 and 109 by the respective rivets 132′ and 132. This plate has a longitudinal length somewhat less than the spacing between the belt rollers (see also FIGURE 10) and supports the upper portion of the belt in mono-planar disposition. It will be noted that the lower portions of the neoprene strips 136 and 136′ (see FIGURE 12) rest upon the belt surface and are flexed inwardly toward the side walls of the spout 55. Upon vibration of the spout and movement of the belt, material flows out of the outlet opening 80 at a positive, uniform rate, said rate being determined by the belt speed and the position of the gate 73. The neoprene strips serve as side walls to retain the material on the belt as it is transported from the spout to the discharge end of the belt.

Referring again to FIGURES 10 and 11, a doctor blade 145 has a transverse rod 146 secured thereto, which rod is pivotally supported in aligned notches formed in the vertical plates 108 and 109. The upper portion of the doctor blade is maintained in engagement with the belt 71 by means of a tension spring 147 having one end fastened to an integral ear formed on the blade and the other end fastened to a rod 148 disposed in a second set of aligned notches formed in the vertical plates. The doctor blade serves to direct the flow of material from the discharge end of the belt into a process stream, or etc. A rake 149, comprising a plurality of spaced rods, is pivotally supported by a rod passing through aligned holes formed in the two guide rail assemblies, and serves to break up the mass of the transported material as it falls upon the doctor blade. Attention is directed to the horizontally-extending bar 150 (see FIGURE 10) having an end firmly secured to a post 151 that is carried by the base plate 124. The function of the bar 150 will be described hereinbelow.

It will now be apparent that the entire conveyor assembly (see particularly FIGURES 10 and 11) pivots about the aligned axes of the flexure pivots. Such assembly is initially balanced, with no material on the belt, by means of the poise 105, see FIGURE 2. Such poise is then secured in fixed position on the poise bar. The poise 106 is now set to a selected mark on the scale, say, one pound. This unbalances the entire weighing mechanism such that the conveyor assembly will again be in the balanced condition when the quantity of material spread over the belt is equal to one pound.

Referring again to FIGURES 2 and 3, the rear portion of the apparatus is closed by side and rear cover plates, the upper portion of the side plate 153, visible in FIGURE 2, being broken away to expose the gyrator arrangement. Secured to the two rear legs 12 and 14 (see FIGURE 3), is a framework 154 having rectangular openings 155 and 156 formed therein. These openings normally are closed by removable panels, one of which carries the control components such as switches, signal lights, etc. The horizontally-extending rod 150, carried by the conveyor assembly, extends into the chamber exposed by the lower opening 155 and has secured thereto a vertical bar carrying the spaced, permanent magnets 157 and 158. A pair of magnetically-actuated mercury switches 159, 160 are adjustably carried by a vertical support secured to the cross leg 15. These switches are of the normally-open type and are arranged to energize the gate motor, for rotation in one or the other direction, in response to movement of the bar 150 from the illustrated balanced position. The balanced position of the weighing mechanism is indicated by the alignment of a reference mark, carried by the poise arm (see FIGURE 2) with a fixed reference mark formed on a plate 161 secured to the side cover panel 153 and the maximum unbalance of the mechanism is defined by fixed stops 162 and 163 supported on the cross leg 15 (see FIGURE 3).

FIGURE 13 is a schematic circuit diagram of the apparatus and includes a diagrammatic representation of pertinent mechanical components. Electrical power is obtained by means of a plug connector 165 connectable to a 110 volt A.C. power line. The gyrator motor 30 and the synchronous belt-drive motor 114 have their windings connected directly to the power line, through the fuse 116, upon closure of the line switch 167. These motors, therefore, run continuously during operation of the apparatus. Rotation of the eccentrically mounted weights 38 and 39 results in the vigorous vibration of the unitary structure consisting of the strut 36, the conical member 37, the baffle 90, the spout 55 and the gate 73. Such unitary structure is isolated, vibrationally, from the supply hopper 20 so that the weight of the hopper and the contained material does not constitute a load on the gyrator. Consequently, such structure is subjected to vigorous vibrations of a character such as to impart a pseudo fluid characteristic to the material contained in the conical member and the downspout, thereby providing a positive flow of the material out of the outlet opening 80 and onto the belt 71.

The energization of the synchronous motor 114, results in movement of the belt 71 at a constant speed, said belt being supported by the flat plate 140 and closing, effectively, the open bottom of the spout. Material from the hopper passes into the conical member and into the downspout and is spread on the belt at a depth determined initially by the vertical height of the outlet opening 80.

The entire weighing mechanism comprising the belt, the belt-drive motor, the bar 150 and the movable contacts 168 and 169, together with all associated supporting structures, pivots about a fulcrum F, which fulcrum corresponds to the aligned axes of the flexural pivots, already described. Importantly, this fulcrum lies in a vertical plane which bisects the relatively thin gate 73. Consequently, the tilting of the belt, about such fulcrum, (and over a practical angular range of ± a few degrees, as defined by the fixed stops 162 and 163) results in no change in the height of the outlet 80. Thus, the rate at which material is transferred onto the belt is unaffected by the angular position of the belt.

In FIGURE 13, the contacts for controlling the energization of the gate motor 59, comprise the two movable contacts 168 and 169 and the associated stationary contacts 170 and 171, respectively. Obviously, these contact sets are equivalent to the magnetically-operated mercury switches, above described. When the quantity of material carried by the belt exceeds the preset balance condition of the weighing mechanism, the mechanism will tilt counterclockwise and eventually close the upper contacts 168 and 170. This energizes the gate motor 59 to run in a direction to lower the gate 73 and thereby reduce the rate at which the material passes through the outlet 80. Conversely, a reverse unbalance of the weighing mechanism results in the closure of the lower contacts 169 and 171 thereby energizing the gate motor for rotation in a reverse direction to thereby raise the gate and increase the material flow through the outlet.

With the described vibration of the downspout 55, the reduction of the head load of the material upon the belt, and the pivoting of the belt about the stated fulcrum F, the apparatus has an inherent, minute-to-minute feed accuracy of 0.5 to 1.0 percent. Under normal operation, the weighing mechanism flutters about the preset balance point without closure of the gate-control contacts. Such contacts, therefore, serve primarily to correct for long term drift as may be effected, for example, by changes in the moisture content of the particular material.

An arrangement for manually setting the gate to change the feed rate of the apparatus is shown in FIGURE 14. In this case, an end of the flexible cable 62 (which raises and lowers the gate 73), is disposed within an axial bore formed in the shank portion of an adjusting nut 175 and soldered thereto, said nut preferably having a knurled peripheral surface. The other end of said shank portion is provided with an axial bore receiving the through shaft of a conventional convolution counter 176, these members being secured together by a pin 177 driven through diametrically-aligned holes provided for this purpose. The counter is mounted on a plate 178, which plate is secured to the spout 55 by screws 179. It is here pointed out that the shaft of the counter is spaced from the front wall of the spout by a distance sufficient to permit unobstructed rotation of the nut 175. The other end of the counter shaft passes into an axial bore formed in a cylindrical plug 180 and is soldered thereto, said plug being slidably positioned in a hollow bushing 181. The plug 180 carries a radially-extending pin 182, which pin extends through one of the longitudinally-extending open slots 183 formed in the proximate end of the bushing 181.

The bushing 181 includes an integral, circular flange 184, having a knurled peripheral surface, and is provided with an additional longitudinal slot 185. A plug 186, also slidable within the bushing 181, includes an integral collar 187 secured to the output shaft 61, of the gate motor, by a set screw 188. A radially-extending pin 189 extends through the slot 185, said pin having an end threaded into a hole provided in the plug 186. The coiled spring 190 is compressed between the end of the bushing 181 and the collar 187 and biases the bushing to the left, thereby retaining the pin 182 in one of the slots 183.

It will be apparent that the flexible cable 62 rotates in correspondence with rotation of the gate motor output shaft 61, when the parts are in the illustrated position. In view of the inherent operating accuracy of the apparatus, adjustment of the gate position occurs only at infrequent intervals and such adjustment requires only a very minor alteration of the gate position. Thus, in actual practice, the output shaft of the gate motor is geared down to rotate at a speed of approximately one revolution per minute. Since the conveyor belt moves at a precise, predetermined speed, the counter 176 is calibrated in terms of the actual feed rate of the apparatus. For example, the illustrated indication of the counter indicates a material feed rate of 1.25 pounds per minute.

In order to change the feed rate of the apparatus to, say, two (2) pounds per minute, the poise 106 (see FIGURE 2) is moved to the "2" pound mark on the poise arm, thereby unbalancing the weighing mechanism to an extent such that the mechanism will be rebalanced when the belt carries two (2) pounds of the material. This requires a substantial elevation of the gate, which would require considerable time to be effected automatically in view of the described low speed of rotation of the output shaft of the gate motor. An immediate adjustment of the gate can be accomplished manually by forcefully moving the bushing 181 (see FIGURE 14) to the right to free the pin 182 from the slots 183, thereby disengaging the plug 180 from the bushing. The flexible cable 62 may now be rotated, by means of the adjusting nut 175 until the counter indicates 2.00. This increases the depth of the material being transported by the belt. When the depth of the material carried by the belt is uniform, that is, when the initial incremental increase in the material depth has been discharged by the belt, the bushing 181 (rotated to align the pin 182 with an end slot 183, if necessary), is released, thereby again coupling the flexible cable to the drive shaft 61. Normally, the stated manual adjustment procedure returns the weighing mechanism to the balanced condition. In any event, after a few corrective cycles effected by the automatic control system, the apparatus can be relied upon to discharge material within one percent of the new feed rate.

Having now described the invention, those skilled in the art will be able to make various changes and modifications in the illustrated apparatus without thereby departing from the scope and spirit of the invention as recited in the following claims.

I claim:

1. In a gravimetric belt feeder of the class described, an endless belt having an active portion normally movable in a given plane, said belt also being mounted for pivotal movement about a horizontal axis, and a material-containing member positioned over the active portion of the belt, said member having an open bottom presented to the belt and an upwardly-extending outlet opening formed in a wall thereof, which opening defines the height of the material transported by the belt, the said axis lying in a plane substantially normal to the said given plane and containing said outlet opening.

2. The invention as recited in claim 1, in combination with vibration-producing means imparting vibration to the material within said member of a character such as to impart a pseudo fluid characteristic thereto.

3. The invention as recited in claim 2, including gate means adjustable to vary the effective height of said outlet opening, and control means responsive to pivotal movement of the belt to adjust the position of the said gate means.

4. Feeder apparatus comprising,
 (a) a material supply hopper having a discharge opening at the bottom,
 (b) a material-receiving member having an open bottom and postioned to receive material from the hopper,
 (c) an endless belt having a normally horizontally-disposed surface positioned to substantially close the bottom of the material-receiving member,
 (d) means forming a vertically-extending opening in the wall of the material-receiving member, which opening extends to the belt surface,
 (e) a gate spanning the opening formed in the material-receiving member and having a lower side edge spaced from the belt surface to define a material outlet opening,
 (f) means mounting the gate for transverse movement with respect to the underlying surface of the belt,
 (g) means moving the belt at a constant speed thereby to transport material through said outlet opening to the discharge end of the belt,
 (h) a beam scale balancing the belt about a horizontal axis when the material being transported by the belt equals a preset weight, said axis lying in a vertical plane passing through the lower side edge of the gate, and
 (i) control means automatically adjusting the spacing between the gate and the belt in response to an unbalanced condition of the belt.

5. The invention as recited in claim 4 including means vibrating said material-receiving member.

6. The invention as recited in claim 4, wherein the material-receiving member is of generally square cross-section, wherein the said opening is formed in the front wall of the material-receiving member, and wherein the lower portion of the rear wall of the material-receiving member slopes toward the front wall.

7. The invention as recited in claim 4, including a generally conical member having a truncated apex forming a central opening, means securing the conical member to the upper end of said material-receiving member, means vibrationally supporting the conical member with the base portion thereof spaced from the hopper, and means vibrating said conical member.

8. The invention as recited in claim 7, wherein the said conical member is vibrated predominantly in a plane normal to the axis of the conical member.

9. The invention as recited in claim 7, including an inverted, conical baffle secured to the said conical member, said baffle having a peripheral surface spaced from the inner wall of the conical member, and wherein the said means vibrating the conical member is a gyrator mechanically coupled to said conical member, said gyrator comprising eccentrically-mounted weights rotatable by an electric motor.

10. The invention as recited in claim 7, in combination with spaced, flexible guide rails extending from the material-receiving member to the discharge end of the belt, said guide rails having lower portions flexed toward each other and supported on the belt.

11. The invention as recited in claim 4, in combination with means for manually setting the gate to provide a predetermined spacing between the lower side edge of the gate and the belt.

12. The invention as recited in claim 11, including visual read-out means mechanically coupled to the gate, said read-out means being calibrated in factors related to the apparatus feed rate.

13. Feeder apparatus comprising,
 (a) a supply hopper having an open bottom,
 (b) a conical member positioned to receive material from the hopper and having a central opening formed at the apex,
 (c) a baffle secured to the conical member, said baffle having a peripheral surface spaced from the inner wall of the conical member to form a path for the flow of material from the hopper into the conical member,
 (d) a downspout of generally square cross-section secured to said conical member and receiving material through the central opening of the conical member, said downspout having an open bottom, an opening formed in the front wall and a rear wall sloping toward the front wall,
 (e) a vertically-disposed gate spanning the opening in the front wall of the downspout,
 (f) means mounting the gate for vertical movement along the front wall of the downspout,
 (g) a beam scale mechanism rotatable about a horizontal axis, said axis lying in a vertical plane which substantially bisects that portion of the gate spanning the said opening,
 (h) an endless belt carried by the scale mechanism and having an upper surface closing the open bottom of the downspout, the spacing between the gate and the belt surface constituting an outlet opening,
 (i) a motor carried by the scale mechanism and moving the belt at a constant speed thereby to transport material through the said outlet opening to the discharge end of the belt,
 (j) means for balancing the scale mechanism when the material being transported by the belt equals a predetermined rate, and
 (k) control means automatically adjusting the gate relative to the belt surface to maintain the scale mechanism in a balanced condition.

14. The invention as recited in claim 13, wherein the said baffle is an inverted conical member and including a deflector plate disposed within the downspout, said deflector plate being secured to the front wall of the downspout and sloping toward the belt surface.

15. The invention as recited in claim 13, including an electro-mechanical gyrator mechanically coupled to said conical member, said gyrator vibrating the said conical member at a frequency and amplitude to effectively fluidize the contained material.

16. The invention as recited in claim 13, wherein the said control means comprises a pair of spaced, normally-open contacts; a reversible electric motor; means carried by the scale mechanism for effecting closure of one or the other pair of said contacts upon unbalance of the mechanism in one or the other direction; circuit elements energizing the reversible motor for rotation in one direction upon closure of one pair of contacts and in the other direction upon closure of the other pair of contacts; and coupling mechanism imparting linear movement of the said gate in correspondence with rotation of said motor.

17. The invention as recited in claim 16, including a revolution counter constituting a component of said coupling mechanism, said counter being calibrated in factors indicative of the apparatus feed rate.

18. The invention as recited in claim 17, including manually-operable means for disconnecting the counter from said motor, and manually-operable means for adjusting the spacing between the gate and the belt to change the apparatus feet rate.

19. The invention as recited in claim 16, wherein said contacts are magnetic mercury switches and wherein the said means for effecting closure of one or the other switch comprises spaced permanent magnets.

20. The invention as recited in claim 13, including a pair of spaced, flexible guide rails disposed above the belt surface, said guide rails having lower portions riding on the belt surface and flexed inwardly toward the side walls of the said downspout.

References Cited by the Examiner

UNITED STATES PATENTS

| | | | |
|---|---|---|---|
| 2,083,391 | 5/1937 | Murray | 222—55 |
| 2,753,099 | 6/1956 | Jenner et al. | 222—55 X |
| 2,767,926 | 10/1956 | Trief et al. | 222—55 X |

FOREIGN PATENTS

| | | |
|---|---|---|
| 916,473 | 8/1954 | Germany. |
| 854,512 | 11/1960 | Great Britain. |

OTHER REFERENCES

Sch. 12,061—German printed application (Von Petery) printed April 1956.

LOUIS J. DEMBO, *Primary Examiner.*

HADD S. LANE, *Examiner.*